(12) United States Patent
Wiesing

(10) Patent No.: US 11,851,823 B2
(45) Date of Patent: Dec. 26, 2023

(54) RAIL SYSTEM

(71) Applicant: Horstkemper Maschinenbau GmbH, Rietberg-Mastholte (DE)

(72) Inventor: Helmut Wiesing, Delbrück (DE)

(73) Assignee: Horstkemper Maschinenbau GmbH, Rietberg-Mastholte (DE)

( * ) Notice: Subject to any disclaimer, the term of this patent is extended or adjusted under 35 U.S.C. 154(b) by 288 days.

(21) Appl. No.: 17/298,736

(22) PCT Filed: Jan. 14, 2020

(86) PCT No.: PCT/EP2020/000013
§ 371 (c)(1),
(2) Date: Jun. 1, 2021

(87) PCT Pub. No.: WO2020/177918
PCT Pub. Date: Sep. 10, 2020

(65) Prior Publication Data
US 2022/0056646 A1 Feb. 24, 2022

(30) Foreign Application Priority Data
Mar. 6, 2019 (EP) ..................... 19000115

(51) Int. Cl.
*E01B 25/28* (2006.01)
*E01B 9/60* (2006.01)

(52) U.S. Cl.
CPC ............... *E01B 25/28* (2013.01); *E01B 9/60* (2013.01)

(58) Field of Classification Search
CPC . E01B 25/28; E01B 9/60; E01B 25/00; E01B 11/10; E01B 2201/02; F16C 29/10; F16C 2226/10; F16C 2322/39; F16C 29/004; F16C 29/005
See application file for complete search history.

(56) References Cited

U.S. PATENT DOCUMENTS

| | | | | |
|---|---|---|---|---|
| 1,026,300 A | * | 5/1912 | Braine | ................ E01B 11/10 238/188 |
| 6,616,061 B1 | | 9/2003 | Penny | |
| 7,641,128 B2 | * | 1/2010 | Remington | ............... E01B 9/60 238/354 |
| 10,208,780 B1 | * | 2/2019 | Mangone, Jr. | ........... H02G 3/32 |
| 11,060,243 B2 | * | 7/2021 | Schäper | ................ E01B 25/28 |
| 2015/0203332 A1 | | 7/2015 | Münter | |
| 2019/0127922 A1 | | 5/2019 | Schäper | |

FOREIGN PATENT DOCUMENTS

| | | | | |
|---|---|---|---|---|
| DE | 4318383 C1 | * | 7/1994 | ............... B61B 1/00 |
| DE | 4318383 C1 | | 7/1994 | |
| DE | 10328336 A1 | | 1/2005 | |
| DE | 102005003153 A1 | | 7/2006 | |
| EP | 2890625 A1 | | 7/2015 | |
| WO | 9963160 A1 | | 12/1999 | |
| WO | 2017178158 A1 | | 10/2017 | |

* cited by examiner

*Primary Examiner* — Mark T Le
(74) *Attorney, Agent, or Firm* — Smartpat PLC

(57) ABSTRACT

A rail system (1) has a rail (20), a support device (10) for the rail (20), and a clamping device (40) for fixedly clamping the rail (20) in the support device (10). The clamping device (40) fixedly clamps the rail (20) in the support device (10) only in an operating situation. In the operating situation, a holding device (30) is arranged between the clamping device (40) and the rail (20) and releasably clamps the rail (20) in an installation situation in a predetermined position in the support device (10).

16 Claims, 2 Drawing Sheets

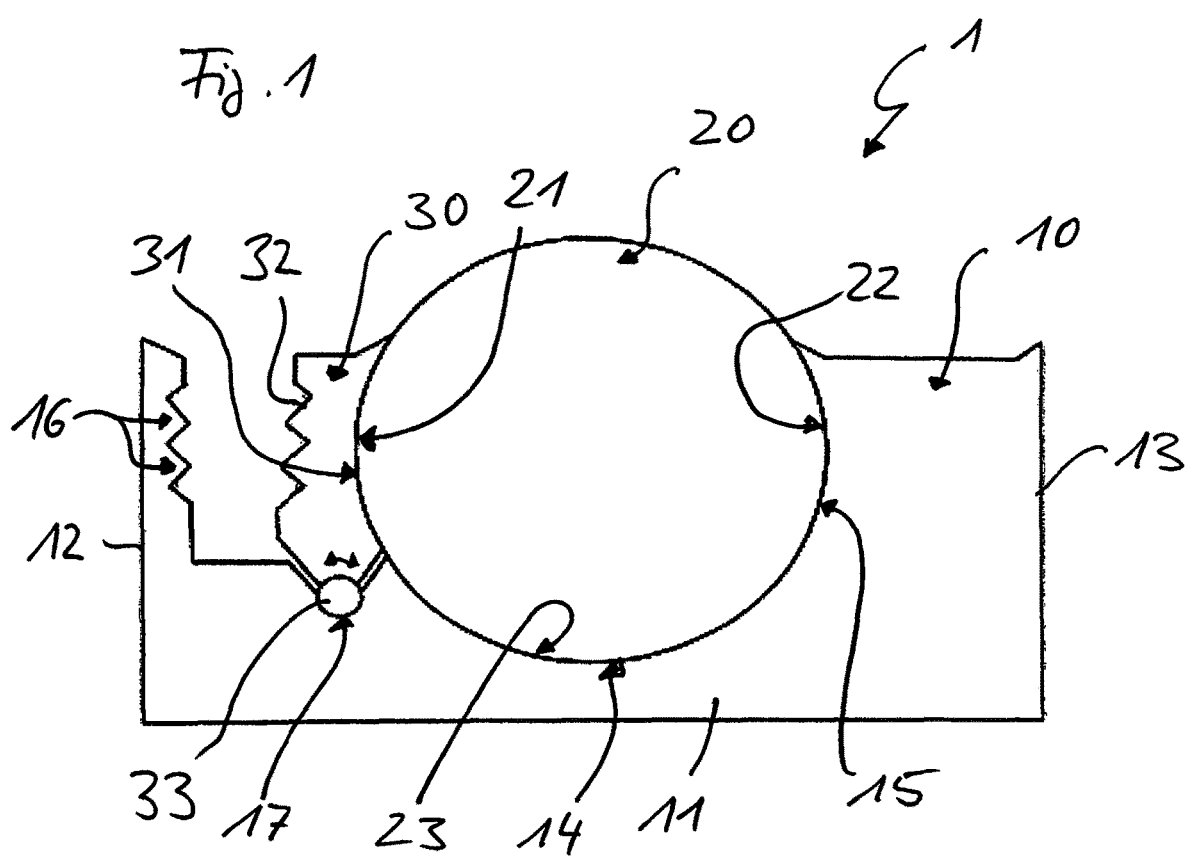

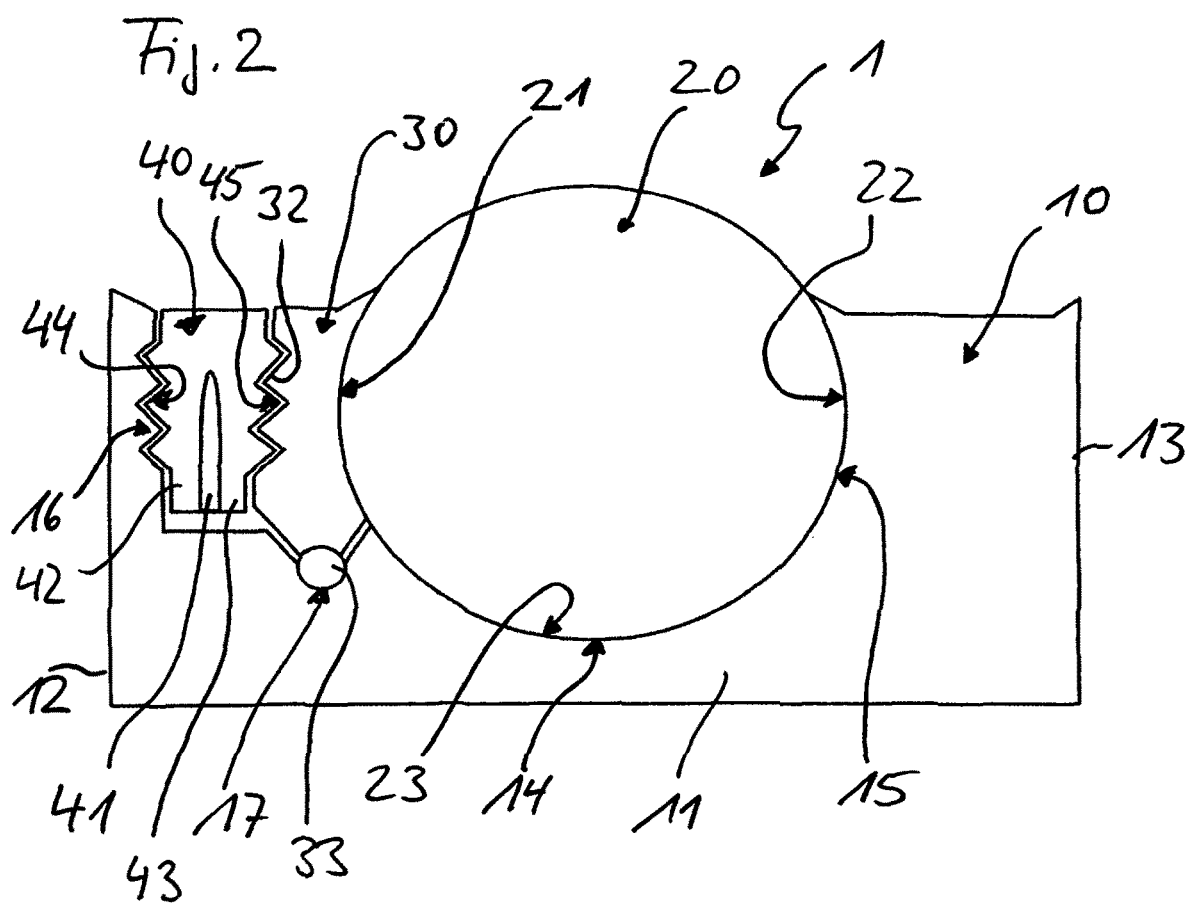

RAIL SYSTEM

CROSS-REFERENCE TO RELATED APPLICATION

This application is a national stage application, filed under 35 U.S.C. § 371, of International Patent Application No. PCT/EP2020/000013, filed on Jan. 1, 2020, which claims the benefit of European Patent Application No. 19000115.6, filed Mar. 6, 2019.

TECHNICAL FIELD

The present disclosure pertains to a rail system having a rail, a support device for the rail and a clamping device for tightly clamping the rail in the support device. The clamping device tightly clamps the rail in the support device only in an operating situation.

BACKGROUND

A rail system of this type is known, for example, from EP 2 890 625 B1. The rail system described in this publication comprises a rail that is supported on a base of a support profile in a rail bed and not clamped in an installation situation (see FIG. 2 and Paragraph 0041 in EP 2 890 625 B1). A gap is located between the rail and a sidewall of the support profile such that the rail can easily dislocate from its optimal position in the rail bed and slide into the gap during the installation situation. This occurs, in particular, if the rail also has a significant length and/or if such a gap is located on both sides of the rail.

In both instances (gap on one or both sides of the rail), the rail therefore has in the installation situation no sufficient lateral support for also ensuring the precise position of the rail in the rail bed during the installation over the entire length of a rail section to be installed. The rail therefore is consistently at risk of sliding into the one gap or, if applicable, also into the other gap during the installation and has to be sectionally repositioned in the rail bed in such instances. This is an elaborate and time-consuming process.

SUMMARY

The present disclosure is based on the objective of enhancing a rail system of the initially cited type in such a way that a rail already can be precisely positioned in a support device in an installation situation.

This objective is attained in that a holding device is in the operating situation arranged between the clamping device and the rail and in an installation situation clamps the rail in a predefined position in the support device in a releasable manner.

The rail system simplifies the final installation in comparison with the prior art. The holding device ensures an interim support of the rail installed in the support device. In this installation situation, the final installation is realized by simply inserting the clamping device into the support device in order to thereby conclude the installation situation and to achieve an operating situation, in which the rail is tightly clamped in the support device.

The rail system therefore comprises four components that interact in the operating situation and at least three components that interact in the installation situation.

Another advantage is that the holding device is movably supported in the support device and movable in the installation situation. The holding device is in the installation situation guided during its movement due to the movable support of the holding device in the support device. Consequently, the user does not have to pay as much attention to guiding the holding device during the movement as in instances, in which no holding device is provided.

Another advantage is that the holding device is pivotably supported in the support device and pivotable in the installation situation. The actuation of the holding device by a user is thereby simplified. The user can take hold of the holding device from above at a suitable location and bring about a pivoting movement. Such a suitable location can be easier to access for the user from above than in instances, in which the holding device would have to be moved, for example, in a translatory manner from one side. When the rail system is installed on a base, the suitable location is in a pivotable support accessible from above, but rather from the side in a translatory support.

Another advantage is that the holding device is a holding profile, which has a holding profile contact surface for abutting on the rail and a holding profile structure surface lying opposite of the holding profile contact surface.

Due to the different design of the opposing holding profile contact surfaces, it is possible to assign different functions to these contact surfaces.

Another advantage is that the clamping device is a clamping profile, which has a first clamping profile structure surface for abutting on the holding profile structure surface and a second clamping profile structure surface for abutting on the support device. At least a non-positive connection between the support device, the clamping profile and the holding profile is ensured in the operating situation due to the allocation of the respective structure surfaces to another component.

Another advantage is that the clamping device is realized in the form of an expansion spring, which is pretensioned in the operating situation. The design of the clamping device in the form of an expansion spring, which is pretensioned in the operating situation, promotes the non-positive connection between the support device, the clamping device and the holding device in the operating situation, i.e. when the rail is inserted into the support device.

Another advantage is that the clamping device has a slot, which at least partially separates a first part of the clamping profile carrying the first clamping profile structure surface from a second part of the clamping profile carrying the second clamping profile structure surface.

Due to the design of the slot, both parts of the clamping profile are pressed against one another in the operating situation and therefore respectively pretensioned in a direction extending away from the slot.

Another advantage is that the holding profile contact surface and the support device positively accommodate the rail in the operating situation and in the installation situation. This ensures that the rail also cannot separate from the support device in case the non-positive connection fails.

Another advantage is that the holding profile contact surface is realized in a concave manner and adapted to a first convex section of the rail. The concave and convex interaction between the holding profile contact surface and the rail leads to a particularly advantageous force effect in the operating situation and to an easily producible positive fit in the installation situation.

It is also advantageous that the first clamping profile structure surface has a structure, which is adapted to a structure of the holding profile structure surface in such a way that the first clamping profile structure surface and the second clamping profile structure surface can engage into one another in the operating situation. For example, the holding profile structure surface and the clamping profile structure surface may be provided with mutually adapted teeth or catches, which in the operating situation produce a non-positive and positive connection between the clamping profile and the holding profile such that the clamping profile can no longer be removed from the support device.

It is likewise advantageous that the second clamping profile structure surface has a structure, which is adapted to a structure of a first sidewall of the support device in such a way that the second clamping profile structure surface and the first sidewall can engage into one another in the operating situation. In this way, the same non-positive and positive connection is produced between the clamping device and the support device, as well as between the clamping device and the holding device. A tight, inseparable seat of the clamping device between the support device and the holding device is thereby ensured in the operating situation.

Additional advantages result from the other characteristics of the dependent claims.

All in all, an advantage can also be seen in that the clamping device can in the preferred embodiment be pressed into the support device without a separate tool and is tightly inserted into the support device without additional fastening means.

An embodiment of the present invention is described in greater detail below with reference to the drawings.

BRIEF DESCRIPTION OF THE DRAWINGS

FIG. 1 shows a schematic cross section through a rail system in an installation situation without clamping device.

FIG. 2 shows a schematic cross section through the rail system according to FIG. 1 in an operating situation with clamping device.

DETAILED DESCRIPTION

FIG. 1 schematically shows a cross section through a rail system 1. The rail system 1 essentially comprises a support device 10, a rail 20, a holding device 30 and a clamping device 40.

The rail system 1 differs from a device due to the systemic interaction of the aforementioned components in different situations. In the context of the present disclosure, a distinction is made between an installation situation (FIG. 1) and an operating situation (FIG. 2).

Concrete shapes, materials and manufacturing processes are not important for the systemic interaction of the aforementioned components. For example, the rail 20 not only may have a circular cross section as in the preferred embodiment shown, but also noncircular cross sections in other embodiments. The support device 10 may in a cross section likewise have an upwardly open profile or an at least partially closed profile. In the preferred embodiment, the holding device 30 is pivotably supported such that it can carry out a guided movement. In other embodiments, the holding device 30 may also be moved in a translatory manner, namely either in a guide or in an unguided manner. The clamping device 40 may in other embodiments also be designed arbitrarily as long as a clamping effect can be achieved with this design. The support device 10 is in the preferred embodiment manufactured of aluminum in an extrusion process. In other embodiments, the support device 10 may also be manufactured of other materials and with other manufacturing processes. The rail 20 is in the preferred embodiment manufactured of hardened and ground steel 10f53. Different materials may be used for manufacturing the rail 20 in other embodiments. The holding device 30 is in the preferred embodiment manufactured of aluminum in an extrusion process. In other embodiments, the holding device 30 may also be manufactured of other materials and with other manufacturing processes. The clamping device 40 is in the present embodiment likewise manufactured of aluminum in an extrusion process. In other embodiments, the clamping device 40 may also be manufactured of other materials and with other manufacturing processes. Furthermore, the support device 10, the holding device 30 and the clamping device 40 may in other embodiments be manufactured of different materials and with different manufacturing processes.

The dimensions of the rail system 1 can be arbitrarily adapted to the respective needs and requirements. In the preferred embodiment, in which the rail 20 is realized in the form of a shaft, the rail system 1 preferably is categorized in accordance with the shaft diameter. Usual diameters for a rail 20 in the preferred embodiment are 25 mm, 30 mm, 40 mm, 50 mm or 60 mm.

According to the preceding explanations, the rail system 1 is in FIG. 1 illustrated in an installation situation, in which the clamping device 40 is not yet located in the rail system 1. FIG. 2 shows the rail system 1 in an operating situation, in which the clamping device 40 is inserted into the rail system 1.

In the preferred embodiment, the support device 10 is realized in the form of a support profile, which in a cross section is open on its upper side in the installation situation and in the operating situation. The support device 10 has a base 11, a first sidewall 12 and a second sidewall 13. A rail bed 14 is formed on the base 11 of the support device 10 and adapted to the circumferential shape of the rail 20. In the preferred embodiment, the rail bed 14 in the base 11 of the support device 10 is realized in a concave manner. The second sidewall 13 is realized in such a way that it laterally adjoins the rail bed 14 and complements this rail bed without transition. In the preferred embodiment shown, the rail bed 14 therefore extends continuously into a concave lateral section 15 of the second sidewall 13. The lateral section 15 of the second sidewall 13 therefore is likewise realized in a concave manner in the present embodiment.

The first sidewall 12 of the support device 10 lies at a lateral distance from the rail bed 14 such that a gap is formed between the rail 20 arranged in the rail bed 14 and the first sidewall 12. The first sidewall 12 is provided with a structure 16 on its inner side, i.e. in the direction of the gap, wherein said structure is formed by teeth or catches in the preferred embodiment. The teeth or catches of the structure 10 may be realized identically or differently and/or regularly or irregularly. In addition, a joint socket 17 is formed in the base 11 of the support device 10 in the region of the gap. The holding device 30 is inserted into this joint socket such that the holding device 30 can in the installation situation be moved/pivoted about a pivoting axis in the joint socket 17.

The rail 20 has a first convex section 21, a second convex section 22 and a third convex section 23. In the present preferred embodiment, the rail 20 is a shaft with a circular cross section such that the first convex section 21, the second convex section 22 and the third convex section 23 respectively form part of the circular shaft circumference. The second convex section 22 is adapted to the concave lateral section 15 of the second sidewall 13. The third convex section 23 of the rail 20 is adapted to the concave rail bed 14. In the context of the present disclosure, "adapted" means that the radii of the respectively associated convex and concave (lateral) sections are essentially identical.

In the present embodiment, the holding device 30 is realized in the form of a holding profile and has a holding profile contact surface 31, which is realized in a concave manner and adapted to the first convex section 21 of the rail 20. In this case, the term adapted also means that the radii of the respectively associated convex and concave sections are essentially identical. The holding device 30 furthermore has a holding profile structure surface 32 that lies opposite of the holding profile contact surface 31. The holding profile structure surface 32 has a structure that is composed of teeth or catches in the present embodiment. These teeth or catches of the holding profile structure surface 32 may also be arranged identically or differently and/or realized regularly or irregularly. In the present embodiment, the structure of the holding profile structure surface 32 is realized in a mirror-inverted manner referred to the opposite structure 16 of the first sidewall 12. The holding device 30 is movable in the installation situation. In the preferred embodiment illustrated in FIG. 1, the holding device 30 is pivotably supported in the joint socket 17 of the support device 10 with an extension piece 33. In the present embodiment, the pivotability results in a pivoting range that is dependent on the clearance/play illustrated between the holding device 30 and the base 11 of the support device 10. The pivoting range is therefore limited to an acute angle and defined by the base 11, which borders on the joint socket 17 and on which the holding device 30 optionally abuts.

As already mentioned above, the mobility of the holding device 30 may be technically implemented in different ways in other embodiments. In the present embodiment, the holding device 30 is in the installation situation movable to such an extent that the rail 20 can during the installation be inserted into the rail bed 14 of the support device 10 without being impeded by the holding device 30, wherein the holding device 30 can after the insertion of the rail 20 into the rail bed 14 be pivoted against the rail 20 in the clockwise direction until the holding profile contact surface 31 abuts on the first section 21 of the rail 20 (see double arrow in FIG. 1). In the preferred embodiment shown, the rail 20 therefore is securely and positively held in the rail bed 14 and on the concave lateral section 15 of the second sidewall 13 in the installation situation.

In the installation situation illustrated in FIG. 1, a gap still exists between the first sidewall 12 and the holding device 30. The clamping device 40 is inserted into this gap in order to achieve the operating situation illustrated in FIG. 2. In the present embodiment, the clamping device 40 is a clamping profile that is pressed into the gap between the first sidewall 12 and the holding device 30 from above. Since this pressing operation does not require a rotational movement as it is the case in the prior art, the clamping device 30 can be easily pressed in vertically from above with a foot or also with a hand.

The clamping device 40 and has a slot 41 that divides the clamping device 40 into a first part 42 and a second part 43. The first part has a first clamping profile structure surface 44 and the second part 43 has a second clamping profile structure surface 45. In the present embodiment, the structure of the two structure surfaces is formed by teeth or catches. These teeth or catches may be realized identically or differently and/are arranged regularly or irregularly. The structures of the first clamping profile structure surface 44 and the second clamping profile structure surface 45 are in the present embodiment realized in a mirror-inverted manner. Furthermore, the structures of the clamping device 40 are respectively adapted to the structure 16 of the first sidewall 12 and to the structure of the holding profile structure surface 32 such that the structure of the clamping device 40 can engage into the respective structure of the first sidewall 12 and the holding device 32 in a self-locking manner after the clamping device has been pressed into the gap. The cross section of the gap between the holding device 32 and the first sidewall 12 is slightly smaller than the width of the clamping device such that the first part 42 and the second part 43 are slightly compressed when the clamping device is pressed into the gap. A pretension with a spring effect, which corresponds to that of an expansion spring, is achieved in the operating situation due to the slot 41 in the clamping device 40. In this way, the clamping effect is increased such that the holding device 30 and the rail 20 are respectively fixed in position.

In the preferred embodiment, the clamping device 40 can be pressed into the rail system 1 without a separate tool. The removal of the clamping device 40 from the rail system 1 is in the preferred embodiment not possible without destroying the clamping device 40. In other embodiments, however, the clamping device 40 may be technically implemented in different ways such that it can be inserted and removed with separate tools.

The rail system 1 may be installed on a substructure individually, in pairs of two parallel rails 20 or also in a group consisting of multiple (e.g. three) parallel rails 20. Vehicles can be moved on the rail system in a rolling manner in that these vehicles are supported on the respective rail with wheels.

LIST OF REFERENCE SYMBOLS

1 Rail system
10 Support device
11 Base
12 First sidewall
13 Second sidewall
14 Rail bed
15 Concave lateral section
17 Joint socket
20 Rail
21 First convex section
22 Second convex section
23 Third convex section
30 Holding device
31 Holding profile contact surface
32 Holding profile structure surface
33 Extension piece
40 Clamping device
41 Slot
42 First part
43 Second part
44 First clamping profile structure surface
45 Second clamping profile structure surface

The invention claimed is:

1. A rail system (1), comprising:
a rail (20) having a circular cross section;
a support device (10) for the rail (20), the support device having
a rail bed (14) formed on a base (11) of the support device (10),
a first side wall (12) extending upwardly from the base (11) on a first side of the rail (20), and
a second side wall (13) extending upwardly from the base (11) on a second side of the rail (20), the second side wall having a concave lateral section (15) which reaches partially around a lower half of the rail (20) and an upper half of the rail (20);

a holding device (30) arranged between the first side wall (12) and the rail (20), the holding device (30) having a concave holding profile contact surface (31) configured to reach partially around the lower half of the rail (20) and the upper half of the rail (20); and a clamping device (40) for clamping the rail (20) in the support device (10), wherein the clamping device (40) is arranged between the first side wall (12) and the holding device (30) and thereby clamps the rail (20) in the support device (10) when the rail system (1) is in an operating situation, and wherein the holding device (30) is movably supported at its lower end in a receiving joint socket of the support device (10) and movable when the rail system (1) is in an installation situation without the clamping device (40) being installed.

2. The rail system according to claim 1,
wherein the holding device (30) is pivotably supported in the support device (10) and pivotable in the installation situation.

3. The rail system according to claim 1,
wherein the holding device (30) is a holding profile, comprising
   the holding profile contact surface (31) for abutting the rail (20), and
   a holding profile structure surface (32) lying opposite of the holding profile contact surface (31).

4. The rail system according to claim 3,
wherein the clamping device (40) is a clamping profile, comprising
   a first clamping profile structure surface (44) for abutting the holding profile structure surface (32) and
   a second clamping profile structure surface (45) for abutting the support device (10).

5. The rail system according to claim 1,
wherein the clamping device (40) is realized in form of an expansion spring, which is pretensioned in the operating situation.

6. The rail system according to claim 4,
wherein the clamping device (40) has a slot (41), which at least partially separates a first part (41) of the clamping profile carrying the first clamping profile structure surface (44) from a second part (42) of the clamping profile carrying the second clamping profile structure surface (45).

7. The rail system according to claim 3,
wherein the holding profile contact surface (31) and the support device (10) positively accommodate the rail (20) in the operating situation and in the installation situation.

8. The rail system according to claim 3,
wherein the holding profile contact surface (31) is realized in a concave manner and adapted to a first convex section (21) of the rail (20).

9. The rail system according to claim 4,
wherein the first clamping profile structure surface (44) has a structure, which is adapted to a structure of the holding profile structure surface (32) in such a way that the first clamping profile structure surface (44) and the holding profile structure surface (32) can engage into one another in the operating situation.

10. The rail system according to claim 4,
wherein the second clamping profile structure surface (45) has a structure, which is adapted to a structure of a first sidewall (12) of the support device (10) in such a way that the second clamping profile structure surface (45) and the first sidewall (12) can engage into one another in a self-locking manner in the operating situation.

11. The rail system according to claim 1,
wherein the support device (10) is a support profile, which in a cross section is open on its upper side in the installation situation and in the operating situation.

12. The rail system according to claim 1,
wherein the support device (10) complements the rail bed (14) on a second sidewall (13) lying opposite of the holding profile contact surface (32).

13. The rail system according to claim 12,
wherein the second sidewall (13) has a concave lateral section (15), which is adapted to a second convex section (22) of the rail (20).

14. The rail system according to claim 1,
wherein the rail (20) is a shaft.

15. The rail system according to claim 1,
wherein the rail bed (14) seamlessly transitions into the concave lateral section (15) of the second side wall (13).

16. The rail system according to claim 1,
wherein, in the installation situation, the holding device (30) can be pivoted towards the first side wall (12) and away from the second side wall (13) such that the rail (20) can be inserted onto the support device (10) between the holding device (30) and the second side wall (13).

* * * * *